United States Patent [19]

Cornell

[11] 4,041,361

[45] Aug. 9, 1977

[54] CONSTANT TORQUE INDUCTION MOTOR DRIVE SYSTEM

[75] Inventor: Edward P. Cornell, Schenectady, N.Y.

[73] Assignee: General Electric Company, Schenectady, N.Y.

[21] Appl. No.: 621,951

[22] Filed: Oct. 14, 1975

[51] Int. Cl.² ............................................. H02K 17/02
[52] U.S. Cl. .................................... 318/227; 318/231; 318/432
[58] Field of Search ........................ 318/227, 231, 432

[56] References Cited

U.S. PATENT DOCUMENTS 3,593,083 7/1971 Blaschke ................................ 318/227
3,909,687 9/1975 Abbondanti .......................... 318/227

Primary Examiner—Robert K. Schaefer
Assistant Examiner—Michael K. Mutter
Attorney, Agent, or Firm—Donald R. Campbell; Joseph T. Cohen; Jerome C. Squillaro

[57] ABSTRACT

An ac induction motor is supplied with variable frequency and amplitude excitation voltage by a power converter. Precise regulation of torque independent of motor parameter changes is achieved by feedback control loops for maintaining at command values constant airgap flux and also the real component of stator current with respect to airgap voltage as measured by a voltage sensor. The real stator current error controls the slip frequency which adjusts to maintain constant airgap power.

3 Claims, 3 Drawing Figures

CONSTANT TORQUE INDUCTION MOTOR DRIVE SYSTEM

BACKGROUND OF THE INVENTION

This invention relates to a motor control system for percisely regulating the torque of an induction motor, and more particularly to a motor control system capable of maintaining constant torque at a selected value independent of machine parameter changes.

Several induction motor closed loop control strategies are available that produce constant torque independent of speed. Most of these strategies are based on the technique of holding slip frequency constant while maintaining constant volts per hertz with stator resistance voltage drop compensation. One control configuration for maintaining constant torque is to maintain constant slip frequency and constant stator current magnitude, while another maintains constant slip frequency and real component of stator current with respect to the terminal voltage compensated for the drop across the stator resistance. These control strategies are based on the assumption that all machine parameters remain constant independent of time and operating point. In reality, the motor heats up changing most parameters with the motor resistance being the most notable. Since rotor temperature is both difficult to measure and to predict in an actual drive, these controls cannot effectively regulate torque. Ignoring magnetizing losses, the developed torque can only be regulated by controlling the total power which crosses the airgap and is dissipated by the rotor resistance, and approximations used in the past based on measuring the input power and subtracting off stator copper losses are not sufficient.

SUMMARY OF THE INVENTION

In accordance with the invention, a motor control system strategy for an induction motor drive implemented with a voltage and frequency controlled power converter is achieved by maintaining airgap flux at a command value (usually rated flux), while also maintaining at a command value the real component of stator current derived with respect to sensed actual airgap voltage (which is proportional to torque). Thus, airgap power and therefore torque are regulated independent of rotor resistance and other parameter changes. The real stator current error in this system commands the slip frequency which adjusts to maintain constant airgap power. This control strategy is capable of precisely regulating torque.

In implementing the drive system, a voltage sensor such as a search coil is provided to sense the rotor-stator airgap voltage, and a tachometer or other speed sensor senses the rotor frequency while a suitable current sensor senses the instantaneous per phase stator supply line current. A stator current processor utilizes the airgap voltage and stator current sensor signals to derive a sensed real stator current with respect to airgap voltage signal. First feedback control means is responsive to the difference between a real stator current command signal (proportional to torque) and the sensed real stator current with respect to airgap voltage signal, and includes a slip frequency regulator for generating a variable slip frequency signal. Second feedback control means is responsive to the difference between the rotor frequency sensor signal and slip frequency signal and generates a control signal which determines the frequency of the alternating excitation voltage supplied by the power converter to the stator windings. Third feedback control means is responsive to the difference between an airgap flux command signal and a sensed airgap flux signal derived from the airgap voltage sensor signal, and generates a second control signal which determines the amplitude of the alternating excitation voltage supplied to the stator windings by the power converter.

DESCRIPTION OF THE PREFERRED EMBODIMENT

Figure 1:
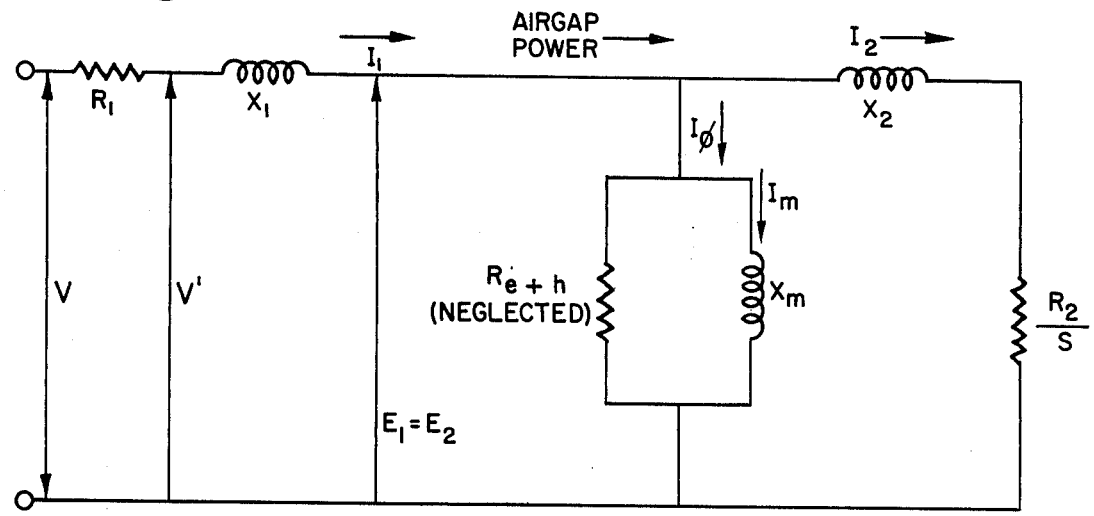
FIG. 1 is a schematic diagram of a per phase equivalent circuit of a three phase ac induction motor.
Figure 3:
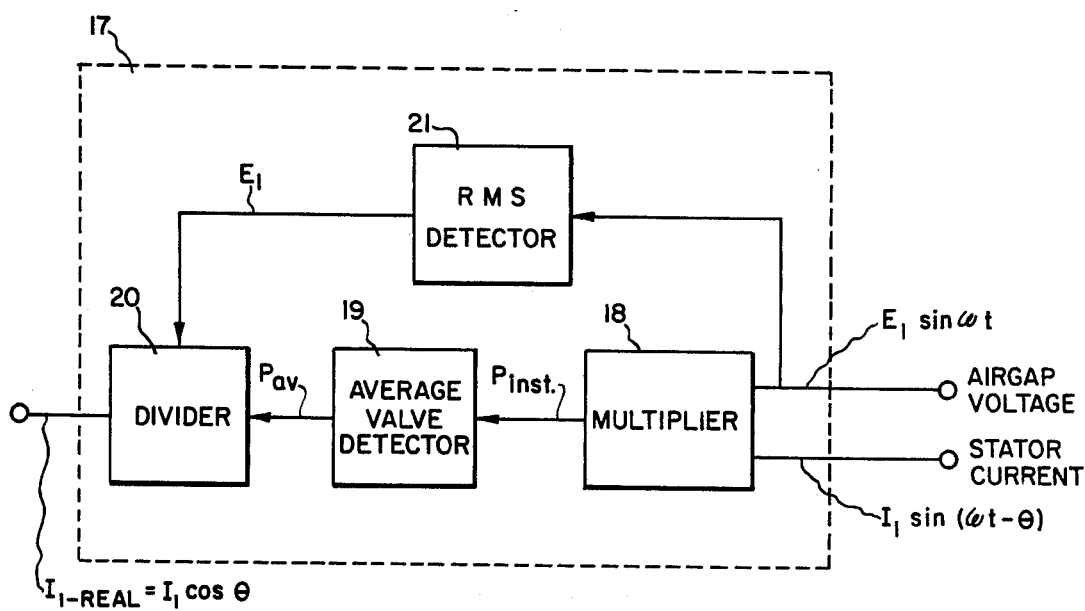
FIG. 3 is a schematic block diagram of one form of current processor for generating a sensed real component of stator current signal derived with respect to actual sensed airgap voltage.
Figure 2:
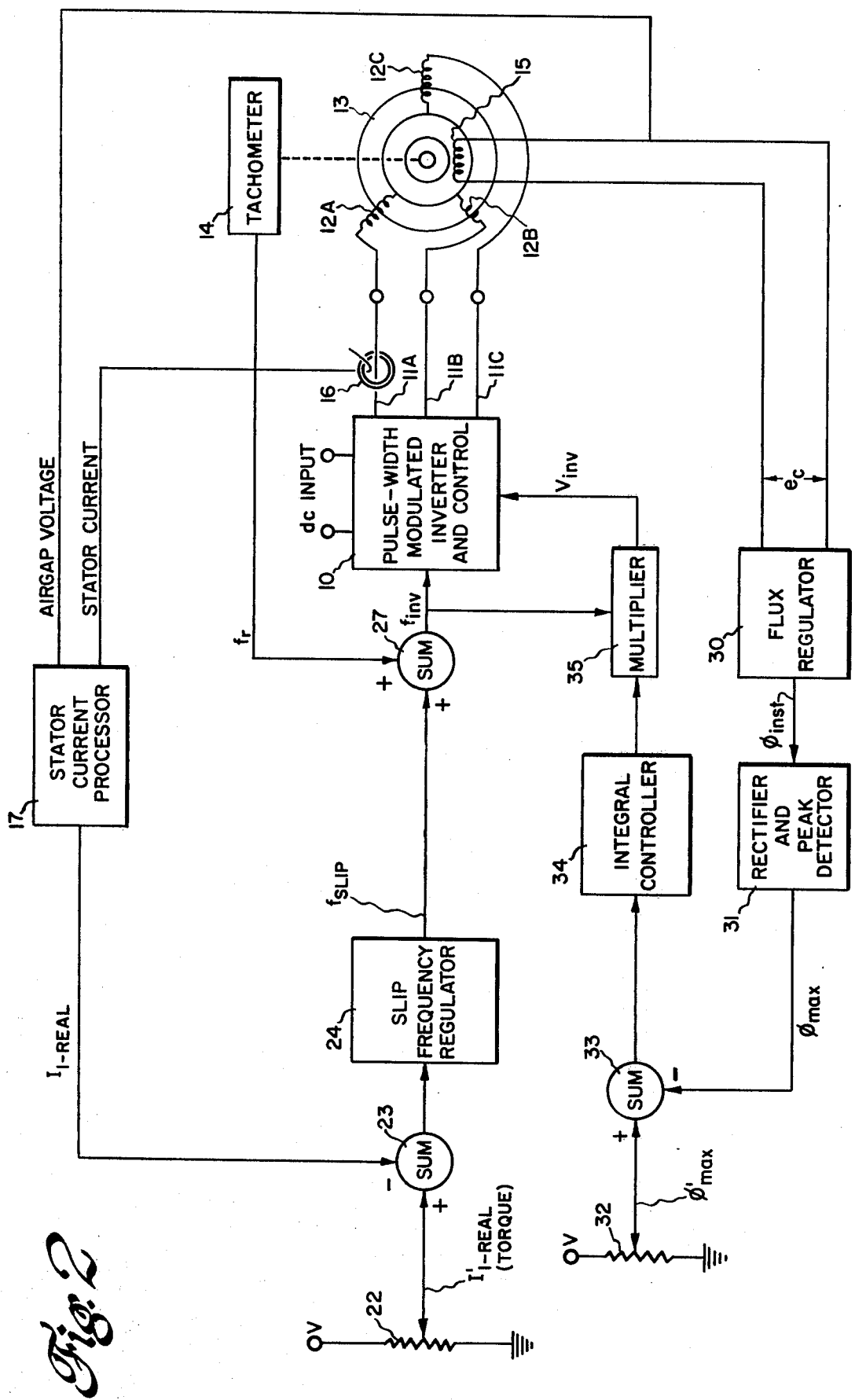
FIG. 2 is a schematic block diagram of a constant torque induction motor drive system for maintaining constant torque independent of rotor resistance.

The torque regulating induction motor drive system illustrated in FIGS. 2 and 3 is capable of the precise regulation of torque for various industrial and traction applications such as machine tool drives, and transit car and electric vehicle drives. Before describing the exemplary embodiment of the invention, the theory and principles underlying the present control strategy will be discussed with regard to the standard per phase equivalent circuit of a polyphase ac induction motor shown in FIG. 1. In this diagram, the stator resistance $R_1$, stator leakage reactance $X_1$ and magnetizing reactance $X_m$ are effectively in series and energized by the stator terminal voltage V, and it is assumed that the magnetizing losses represented by resistance $R_{e+h}$ in parallel with $X_m$ are neglected. Thus the exciting current $I_\phi$ equals the magnetizing current $I_m$, while the stator current is identified as $I_1$. The rotor leakage reactance $X_2$ and rotor resistance referred to the slip $R_2/s$ are effectively in series across $X_m$ and conduct the rotor current $I_2$. The airgap voltage, $E_1 = E_2$, referred to either the stator or rotor is indicated and leads the exciting current $I_\phi$ and thus the magnetizing current by 90°.

Torque can be accurately controlled by controlling the power crossing the rotor-stator airgap. In view of the fact that motor parameters change with time and in particular that the rotor heats up and changes the rotor resistance, airgap power must be controlled as a function of speed independent of rotor resistance in order to have a true torque regulator. As herein set forth, the propulsion control strategy relies on maintaining constant flux and also the real component of stator current as measured by a search coil or other suitable voltage sensor which is ideally located in the airgap. Thus, the airgap voltage $E_1$ is sensed and regulated, and is used to regulate both the flux and the real component of stator current. Keeping in mind the expression for airgap power $P = E_1 I_1 \cos \theta$, and having reference to the equivalent circuit, it is clear that the airgap power is determined accurately by using the real stator current component derived with respect to the airgap voltage $E_1$ rather than being derived with respect to the terminal voltage V, or the voltage V', which is the terminal voltage corrected for the stator resistance losses. With a strategy of this type, airgap power, and therefore torque is regulated independently of the value of rotor resistance.

By way of further explanation based on an equation for developed torque and the current phasor diagram of the induction motor, the torque is proportional to the triangular area enclosed by the current phasor diagram. The three sides of the triangle are $I_1$, $I_2$, and $I_\phi$, and two of the angles are $90° - \theta_g$ and $\theta_g - \theta_2$, where $\theta_g$ is the airgap power factor angle and $\theta_2$ is the rotor power factor angle. It will be evident that the area of the triangle is determined by any three of these quantities. This control effectively regulates torque independent of motor parameters by controlling stator current magnitude, magnetizing current magnitude, and the airgap power factor. The only error in torque control is due to magnetizing losses. Thus, the currents $I_m$ and $I_{1\text{-}real}$ taken with respect to the airgap voltage can be regulated, requiring a measurement of $I_{1\text{-}real}$ and $E_1$.

In the constant torque induction motor drive system shown in FIG. 2, a suitable power converter such as pulse-width-modulated inverter 10 supplies adjustable frequency and amplitude alternating excitation voltage to the three stator supply lines 11A, 11B, and 11C, respectively connected to the stator windings 12A, 12B, and 12C of a standard three-phase squirrel-cage ac induction motor 13. The rotor speed at the motor shaft is continuously measured by a tachometer 14 or other speed sensing means which generates the rotor speed sensor signal $f_r$. A single phase or three phase search coil 15 or other appropriate voltage sensing means is mounted in the motor to continuously sense the rotor-stator airgap voltage and generate a signal representative thereof. The type and location of the search coil is very critical in a flux controller, and airgap voltage ideally is measured using a probe located in the airgap and not in the stator iron. If it is embedded in the stator, the voltage measured will be of a value between $E_1$ and V'. One possible arrangement is a search coil wrapped around a single stator tooth near the stator surface, although this sometimes results in the flux signal being superimposed on a lower frequency waveform produced by tooth ripple. An alternative is to place the search coil around the entire pole pitch, usually several slots, which reduces or eliminates this effect. It is also necessary in this control strategy to provide a suitable current sensing means such as current transformer 16, either single phase as shown or a three phase arrangement, for sensing the instantaneous per phase stator supply line current and generating a stator current sensor signal. In one feedback control loop, the real component of stator current with respect to airgap voltage is obtained in a stator current processor from the actual sensed stator current and the search coil voltage $e_c$. A desired torque command is translated into a real component of stator current command, and the real stator current error controls the slip frequency which adjusts to maintain constant airgap power. An auxiliary feedback control loop is responsive to the difference between the rotor frequency sensor signal and the slip frequency signal for generating an error signal or control signal which determines the frequency of the alternating excitation voltage supplied by the power converter to the induction motor. In a third feedback control loop, constant airgap magnetic flux is maintained by comparing an actual sensed flux signal obtained by integrating the search coil voltage with a desired flux signal, usually rated machine flux, and an integral controller is preferably used for generating another control signal which determines the amplitude of the alternating excitation voltage supplied by the power converter to the induction motor.

In the first of these feedback control loops, the airgap voltage sensor signal $e_c$ generated by search coil 15 and the stator current sensor signal generated by current transformer 16 are supplied to a stator current processor 17 for generating the sensed real stator current with respect to airgap voltage signal $I_{1\text{-}real}$. One form of stator current processor 17 is shown in FIG. 3, although other implementations can be used. The instantaneous airgap voltage sensor signal $E_1 \sin \omega t$ and the instantaeous phase displaced stator current sensor signal $I_1 \sin (\omega t - \theta)$ are applied to a multiplier 18 to obtain an instantaneous power signal. An average power signal $P_{av}$ is generated using an average value detector 19 and fed to a divider 20. In a parallel branch, a root-mean-square airgap voltage signal $E_1$ is obtained using a RMS detector 21 and is also supplied to divider 20. At the output of the current processor is the desired signal $I_{1\text{-}real}$ which equals $I_1 \cos \theta$.

The desired command valve of the real component of stator current $I'_{1\text{-}real}$ is proportional to torque and is set manually or automatically as a controlled variable, as for example, by using a potentiometer 22 energized by a source of voltage V. A first summing circuit 23 is provided for summing the sensed real stator current with respect to airgap voltage signal $I_{1\text{-}real}$ and the real stator current command signal $I'_{1\text{-}real}$, and generating a first error signal which actuates a slip frequency regulator 24 for producing at its output the slip frequency signal $f_{slip}$. Slip frequency regulator 24 is preferably an integral plus proportional controller such that the real stator current error commands slip frequency which adjusts to maintain constant airgap power. As was previously mentioned, the second feedback control means includes a second summing circuit 27 for summing the slip frequency signal $f_{slip}$ and the sensed rotor frequency signal $f_r$ and generating another error signal or control signal $f_{inv}$ which is supplied to pulse-width-modulated inverter 10 and determines the inverter operating frequency. It will be appreciated that the inverter operating frequency corresponds to the frequency of the alternating excitation voltage supplied by the inverter to the motor stator windings and thus to the variable operating frequency of induction motor 13. Three phase pulse-width-modulated power inverter 10 and its controls are of conventional construction, for instance as described in the book, "Principles of Inverter Circuits" by Bedford and Hoft, John Wiley and Sons, Inc., Copyright 1964, Library of Congress Catalog Card No. 64-20078.

In the third feedback control circuit for maintaining constant airgap magnetic flux at a command value, usually rated flux, a sensed airgap flux signal $\phi_{max}$ is derived from the airgap voltage sensor signal $e_c$. To this end, as is known in the art, the airgap voltage sensor signal generated by search coil 15 is supplied to a flux regulator 30 having provision for integrating the airgap voltage and multiplying by a constant to derive an instantaneous flux signal $\phi_{inst}$. To obtain the actual sensed airgap flux signal $\phi_{max}$, the instantaneous flux signal is passed through a rectifier and peak detector 31. A command value of maximum rated motor magnetic flux or any other desired value of maximum flux is set as by means of a potentiometer 32, and the airgap flux command signal $\phi'_{max}$ and the sensed airgap flux signal $\phi_{max}$ are applied to a third summing circuit 33. The flux error signal generated by the summing circuit is fed to an integral controller 34 to reduce the steadystate error to zero. The output of the integral controller is a volts/Hertz control signal which is further supplied to a multiplier 35 where it is multiplied by the control signal $f_{inv}$ in the frequency control loop representing the command value of inverter operating frequency. Accordingly, the second control signal $V_{inv}$ produced by multiplier 35 determines the amplitude of the output voltage of pulse-width-modulated inverter 10, and thus the amplitude of the alternating excitation voltage supplied by the inverter to the motor stator windings. By using multiplier 35 as a link between the frequency control loop and voltage magnitude control loop, it is seen that increases and decreases in the real component of stator current effects corresponding increases in and decreases the stator voltage amplitude so as to result in the production of a controlled airgap flux for the induction motor. Both control signals $f_{inv}$ and $V_{inv}$ are dc control signals whose magnitude determines the operating frequency and output voltage magnitude of inverter 10 as is known in the art. Further, integral controller 34, flux regulator 30, and slip frequency regulator 24 are preferably conventional operational amplifier circuits, although other implementations can be employed.

In summary, precise regulation of torque independent of rotor resistance and other motor parameter changes is achieved in an ac induction motor drive system. In this relatively simple control strategy, easily implemented, constant airgap magnetic flux is maintained while simultaneously regulating the real component of stator current with respect to the airgap voltage. With this type of controlled slip and controlled stator current drive, commanding real stator current is equivalent to commanding developed torque. In the operation of the control, the real stator current error controls the slip frequency which adjusts to maintain constant airgap power.

While the invention has been particularly shown and described with reference to a preferred embodiment thereof, it will be understood by those skilled in the art that various changes in form and details may be made therein without departing from the spirit and scope of the invention.

The invention claimed is:

1. A constant torque induction motor control system comprising
   a power converter for supplying adjustable frequency and amplitude alternating excitation voltage to a plurality of stator supply lines for connection to the stator windings of an induction motor, said motor having a stator and a rotor with an airgap therebetween,
   voltage sensing means comprising a search coil for sensing the instantaneous rotor-stator airgap voltage, speed sensing means for sensing the rotor frequency, and current sensing means for sensing the instantaneous per phase stator supply line current and for respectively generating sensor signals representative thereof,
   stator current processor means for deriving directly from only said airgap voltage and stator current sensor signals a sensed real stator current with respect to airgap voltage signal, and
   first feedback control means responsive to the summation of a real stator current command signal and said sensed real stator current with respect to airgap voltage signal for generating a variable slip frequency signal, second feedback control means responsive to the summation of said rotor frequency sensor signal and slip frequency signal for generating a first control signal which determines the frequency of the alternating excitation voltage supplied by said converter, and third feedback control means responsive to the summation of an airgap flux command signal and a sensed airgap flux signal derived from said airgap voltage sensor signal for generating a second control signal which determines the amplitude of the alternating excitation voltage supplied by said converter, whereby the airgap power and flux are maintained constant for selected values of said command signals,
   said stator current processor means being comprised by a multiplier having as inputs said airgap voltage and stator current sensor signals and generating an instantaneous power signal, means for generating therefrom an average power signal, means for generating a root-mean-square airgap voltage signal, and a divider for dividing said average power signal by said root-mean-square airgap voltage signal to derive said sensed real stator current with respect to airgap voltage signal.

2. A constant torque induction motor control system comprising
   a power converter for supplying adjustable frequency and amplitude alternating excitation voltage to a plurality of stator supply lines for connection to the stator windings of an induction motor, said motor having a stator and a rotor with an airgap therebetween,
   voltage sensing means for sensing the instantaneous rotor-stator airgap voltage, speed sensing means for sensing the rotor frequency, and current sensing means for sensing the instantaneous per phase stator supply line current and for respectively generating sensor signals representative thereof,
   stator current processor means for deriving directly from only said airgap voltage and stator current sensor signals a sensed real stator current with respect to airgap voltage signal, and
   first feedback control means responsive to the summation of a real stator current command signal and said sensed real stator current with respect to airgap voltage signal for generating a variable slip frequency signal, second feedback control means responsive to the summation of said rotor frequency sensor signal and slip frequency signal for generating a first control signal which determines the frequency of the alternating excitation voltage supplied by said converter, and third feedback control means responsive to the summation of an airgap flux command signal and a sensed airgap flux signal derived from said airgap voltage sensor signal for generating a second control signal which determines the amplitude of the alternating excitation voltage supplied by said converter, whereby the airgap power and flux are maintained constant for selected values of said command signals,
   said first feedback control means being comprised by first summing means for summing said sensed real stator current with respect to airgap voltage signal and said real stator current command signal to generate a first error signal, and a slip frequency regulator actuated by said first error signal and generating said slip frequency signal.

3. A control system according to claim 2 wherein said third feedback control means is comprised by second summing means for summing said airgap flux command signal and sensed airgap flux signal to generate a second error voltage which is processed by an integral controller, and a multiplier for multiplying the output of said integral controller by said first control signal to obtain said second control signal.

* * * * *